Patented Aug. 18, 1936

2,051,051

UNITED STATES PATENT OFFICE 2,051,051

NEW CELLULOSE DERIVATIVES AND PROCESS OF MAKING SAME

Leon Lilienfeld, Vienna, Austria

No Drawing. Application June 22, 1932, Serial No. 618,801. In Great Britain July 4, 1931

40 Claims. (Cl. 260—100)

The present invention rests on my discovery that improved artificial structures (e. g. artificial threads) are obtained by using as initial materials for the preparation of artificial structures, the products obtainable by contacting cellulose xanthate with one or more suitable organic compounds which contain at least one nitrogen atom (preferably in a hydroxyl group) attached to a carbon atom and at least one oxygen atom (preferably in a hydroxyl group) attached to a carbon atom and at least one acid residue, preferably a halogen atom attached to a carbon atom, wherein, if each of these three different elements is only once contained in the molecule, not more than two of them are attached to one and the same carbon atom and, if one or two or all three of these different elements are more than once contained in the molecule, there is among them at least one nitrogen atom and at least one oxygen atom and at least one halogen atom which are arranged in such a manner that not more than two of these three different atoms are attached to one and the same carbon atom whilst the third is attached to another carbon atom.

My systematic experiments based upon this idea, in which experiments quite a considerable number of reagents of the aforementioned types (without, of course, exhausting the whole field of all possible types) were reacted with viscose and the products thus obtained worked up into artificial structures, have proved not only that the idea is workable, but also that it leads to new artificial structures of technical value.

The entire process of making artificial structures consists in the following two parts (or steps):

(1) In contacting cellulose xanthate, preferably in the form of its solution (viscose) with one or more suitable organic compounds which contain at least one nitrogen atom attached to a carbon atom and at least one oxygen atom attached to a carbon atom and at least one halogen atom attached to a carbon atom, wherein, if each of these three different elements is only once contained in the molecule, not more than two of them are attached to one and the same carbon atom and, if one or two or all three of these different elements are more than once contained in the molecule, there is among them at least one nitrogen atom and at least one oxygen atom and at least one halogen atom which are arranged in such a manner that not more than two of these three different atoms are attached to one and the same carbon atom whilst the third is attached to another carbon atom, and (2) In working up the products thus obtained into artificial structures, for example artificial threads.

Among the reagents to be contacted with cellulose xanthate in the present process, I prefer organic compounds in the molecule of which at least one nitrogen atom is attached to a carbon atom and at least one oxygen atom is attached to another carbon atom and at least one halogen atom is attached to a third carbon atom.

Many halogen derivatives of nitro- or amino-derivatives of oxy or oxo-compounds and among these halogen derivatives of oxyamines, that is compounds which contain at least one substituted or unsubstituted amino-group and at least one substituted or unsubstituted hydroxyl group and at least one halogen atom have proved suitable for being contacted with cellulose xanthate (viscose) according to the present invention and, according to the present state of my knowledge, among these, halogen derivatives of amino-derivatives of propanols or of homologues of propanols give good results in the present process.

Instead of the compounds set forth above, their derivatives, such as esters or ethers or N-substitution products or (in the case of unsaturated compounds) addition derivatives can also be used as reagents to be contacted with the cellulose xanthate.

Besides nitrogen (or a group containing nitrogen) and oxygen and halogen, the reagents to be contacted with cellulose xanthate in the present process may also contain sulphur or a group containing sulphur.

Instead of the compounds themselves, substances or mixtures of substances capable of giving rise to the formation of the compounds to be reacted with cellulose xanthate (viscose) may be used in the entire process.

The carrying out of the present invention is comparatively simple: The part of the process which is concerned with the preparation of the initial materials consists in principle in bringing together cellulose xanthate, preferably in the form of its solution (viscose) with one or more reagents of the aforementioned types, or with one or more derivatives of any kind of one or more reagents of the aforementioned types. Where feasible and advisable, the cellulose xanthate may be contacted with substances or mixtures of substances which either by reacting with each other or with bodies contained (for example added for this purpose to the cellulose xanthate or viscose) in the cellulose xanthate or viscose may give rise to the formation of one or more reagents of the aforementioned types or of derivatives thereof.

The chosen reagent or reagents may be added to the cellulose xanthate during the sulphidizing step, for example, after at least part of the cellulose xanthate has already been formed, or after the sulphidizing step, but before the cellulose xanthate is dissolved, or at any subsequent stage prior to the conversion of the product into an artificial structure, for instance prior to spinning. In my concurrent application 618,800, is described a process which comprises reacting on di-halohydrines, (e. g. α dichlorhydrine) with ammonia, temperatures below 100° C. being maintained during all of the process, whereby there are produced substances soluble in alcohol and in water, but insoluble in ether.

The product of such treatment is an oily to thick viscous liquid, which is an organic body containing, in an aliphatic group, at least one nitrogen atom (e. g. $NH_2$) attached to a carbon atom, at least one oxygen (e. g. OH group) attached to a carbon atom and at least one halogen atom e. g. chlorine, attached to a carbon atom, these being preferably attached to different carbon atoms. Or the product may contain polymerization products of such compounds, or other derivatives thereof, as indicated above.

The examples include treating 1000 parts of α dichlorhydrine with various amounts of a solution of 240 parts of ammonia gas in absolute alcohol (170, 340, 680, 1185, 1702, 2040 and 2720 parts of the latter being used in different examples), after which the said materials are allowed to react for several hours or up to 40 days, at room temperature or lower, say 16–18° C., or warmed to say 50° C., in an autoclave, shaking or stirring from time to time, or continuously. Or a more dilute alcoholic ammonia solution (e. g. 4%) can be used.

In another modification originally described in Example 13 of said application 618,800 (now included in a divisional application Ser. No. 692,037, filed October 3, 1933), 1000 parts of 23% ammonia water are mixed with 1000 parts of α dichlorhydrine, say at room temperature and the mass heats up, due to the heat of reaction, to 110–120° C., in several hours. The water is evaporated at 30 to 40° C., under a vacuum, and the alcohol-soluble part of the remaining viscous mass constitutes the product.

Another similar mode originally described in Ser. No. 618,800, and now claimed in a divisional case, Ser. 692,037, is to dissolve the α dichlorhydrine in water, and ammonia gas introduced.

A further modification is to introduce dry ammonia gas into the liquid α dichlorhydrine, kept cold by a jacket containing ice water, or otherwise. The desired amount of ammonia can be introduced all in one step or in several successive steps.

From the liquid product of the reaction ammonium chloride may crystallize out (if there be insufficient water present to hold the same in solution). The solvents (water and/or alcohol) can be evaporated, preferably at 30–40° C., in vacuum and/or the crude product can be purified by dissolving in alcohol, precipitating with ether, the ether dissolving out some of the impurities. The products are yellowish, very viscous liquids, resembling thick honey in appearance.

The products are used in the process of the present application, by being caused to react with the cellulose xanthate (viscose).

The cellulose xanthate (viscose) used in the present invention as initial material for the manufacture of the products to be converted into artificial structures may be prepared according to any method known in the viscose art from unmatured alkali cellulose or from alkali cellulose that has been matured for a shorter (for example 12 to 36 hours) or a longer (for example 48 to 96 hours and longer) time. The alkali cellulose may be prepared either steeping the cellulose in an excess of caustic alkali solution and removing the excess of the caustic alkali solution by pressing, centrifuging or the like, or by mixing the cellulose with such a quantity of caustic alkali solution of such strength as, from the start, to incorporate with the cellulose no greater a proportion of caustic alakali than is desired in the sulphidizing step and/or in the final viscose (cellulose xanthate solution). If just the quantity of caustic alkali desired in the viscose has been incorporated with the cellulose, the sulphidized mass may be dissolved in water alone, whilst, if a proportion of alkali smaller than desired in the viscose has been introduced into the cellulose, the sulphidized mass may be dissolved in a caustic alkali solution of such strength as, together with the caustic alkali and water contained in the sulphidized mass, to yield a viscose containing the contemplated percentage of cellulose and caustic alkali.

As a guiding line with regard to the question whether or not the alkali cellulose should be allowed to mature before being brought together with the carbon bisulphide may, among others, serve the desired viscosity of the solution which is to be worked up into artificial structures in general and artificial threads in particular, and in connection therewith the viscosity of the kind of cellulose contemplated. If it is desired to give the solution a definite viscosity, then the alkali cellulose produced from the kind of cellulose contemplated is subjected to a maturing process, if without maturing, this kind of cellulose yields a higher viscosity. If, however, it exhibits from the first, that is without maturing, the desired degree of viscosity, the maturing is superfluous. Now, as the viscosities of the different kinds of cellulose on the market (linters and wood-pulp) differ very much from one another, the question of maturing depends in most cases on the one hand on the viscosity desired of the solution of the product intended for the manufacture of artificial structures, and on the other hand on the viscosity of the kind of cellulose being worked.

The contacting of the viscose with one or more reagents of the aforementioned types may occur at room temperature or at any temperature not very far from room temperature. If desired, however, the bringing together of the viscose with one or more reagents of the aforementioned types may also occur at a raised temperature, say at 50–70° C.

The reagents of the aforementioned types may be incorporated with the viscose in absence or presence of suitable diluents, for example anhydrous or aqueous acetone or water or the like.

According to the nature of the chosen reagent or reagents of the aforementioned types and the quantity of the reagent or reagents used for the quantity of cellulose xanthate under treatment, the time between the contacting step and working up into artificial structures is capable of variation within comparatively wide limits, for instance between the time necessary for filtration and say 120 hours and more.

Instead of or in admixture with the cellulose xanthate (viscose), one of the other cellulose compounds containing one or more CSS-groups, for example a cellulose xantho-fatty acid or a cellulose dixanthate or a cellulose xanthic acid salt or ester or a xanthate of any cellulose derivative or any cellulose compound, for example a xanthate produced according to my U. S. Patent application Ser. No. 435,647 filed Mar. 13, 1930, now Patent 1,858,097, May 10, 1932, or according to my U. S. application Ser. No. 521,023, filed March 7, 1931, or according to my U. S. application Ser. No. 521,017, filed March 7, 1931, or according to my U. S. application Ser. No. 521,018 (now Patent 1,910,440), or according to my U. S. application Ser. No. 556,719, filed August 12, 1931, may be used as the material with which one or more of the reagents of the aforementioned types are contacted. In my application 435,647, filed March 13, 1930, (now Patent 1,858,097) I have described and claimed a process in which to alkali cellulose (say a soda cellulose containing 1000 parts of air-dry cellulose and 2400 parts of NaOH solution of 18% strength) is added 100 parts (or 100 to 300 parts in some cases) of α-monochlorhydrine, then the mass is either xanthated with 600 parts of $CS_2$, the excess of the latter blown off and the xanthated product can be dissolved in caustic alkali solution, or dissolved in caustic alkali solution and thereafter xanthated in solution.

Instead of the α-monochlorohydrine, α-dichlorohydrine, β-dichlorohydrine, epichlorohydrine, ethylene chlorohydrine, or other halogen derivative of a polyhydric alcohol, such as pinacone chlorohydrine (tetramethyl-ethylene chlorohydrine), mannite chlorohydrine, erythrite chlorohydrine or dichlorohydrine, pentaerythrite chlorohydrine, mannitane chlorohydrine, dulcitan monochlorohydrine, divinyl-ethylene glycol chlorohydrine, phenyl propanol chlorohydrine, naphthyl chlorohydrine, 4-methoxy naphthyl propanol chlorohydrine, and the like, as well as the analogous bromine derivatives, can be used, in a similar manner.

In my copending case 521,023, I have described and claimed a process in which alkali cellulose is treated with an etherifying agent (such as dimethyl sulphate, or other dialkyl sulphate, to form an alkyl derivative or ether, of cellulose) or with halogen fatty acids to form an oxycarboxylic acid ether of cellulose, (e. g. monochloracetic acid, to form a glycolic acid ether of cellulose) and the products are xanthated (by reaction with $CS_2$ in the presence of alkali, as NaOH) the product dissolved in a dilute NaOH solution and suitably purified, and precipitated with acids.

In my copending case 521,017, I have described and claimed treating alkaline solutions of the xanthates of said ethers of cellulose of Ser. No. 521,023, by shaping the said solutions (e. g. into thread-like streams) and coagulating and plasticizing said shaped solutions, either with an ordinary coagulating bath, i. e. a bath that has only a coagulating but no or only a slight plasticizing effect or with a coagulating bath which has a plasticizing effect on the freshly coagulated material, e. g. with $H_2SO_4$ of 35% strength, or stronger, or with other acid coagulating baths which have a similar coagulating and plasticizing action, or by treatment first with a dilute acid bath (or equivalent) to coagulate the same and then with a stronger acid bath to plasticize the same.

In my Patent 1,910,440, I have shown and claimed the treatment of alkali cellulose with a cyclic alkylene oxide (e. g. ethylene oxide) the product xanthated, dissolved in dilute alkali solution and treated in shaped condition with coagulating and plasticizing baths, as above exemplified.

Many other organic substances can likewise react with the alkali cellulose, the reaction product xanthated and the xanthate solution shaped, coagulated and (optionally) plasticized. In my copending case 556,719, of August 12, 1931, I have described the employment for that purpose, the following list:—

Di-halogen paraffines, for example compounds of the type of ethylene chloride or tri-methylene chloride i. e. 1,3-dichloropropane (which may be regarded as halogen hydracid esters of dihydric paraffin alcohols (glycols) or of the type of methylene chloride (which may be regarded as neutral halogen hydracid esters of glycols with two hydroxyl groups attached to one and the same carbon atom).

Poly-halogen paraffins.

Halogen olefins (halogen substitution products of unsaturated hydrocarbons).

Halogen derivatives of ethers of mono-hydric alcohols.

Halogen derivatives of aldehydes or ketones.

Sulphochlorides of tertiary amines, such as, for example, the sulphochloride of dimethyl-aniline.

Halogen derivatives of higher fatty acids having at least 6 carbon atoms.

Halogen derivatives of olefine mono-carboxylic acids.

Halogen alkylamines or halogen aralkylamines.

Halogen derivatives of oxy-acids, for example β-di-chloro-lactic acid or β-tri-chloro-lactic acid.

Halogen derivatives of keto-carboxylic acids.

Halogen derivatives of nitro-methane, such as chloro-picrin.

Urea halides, alkyl-urea halides, aralkyl-urea halides and aryl-urea halides.

Tri-thiocarbonic acid esters.

Halogen derivatives of cyanogen, such as cyanogen halides or cyanuric halides (tri-cyanogen halides).

Halogen derivatives of aliphatic di-carboxylic acids, such as halogen succinic acid.

Organic acid esters and inorganic acid esters of di- or poly-hydric alcohols (other than halogen hydracid esters).

Some halogen derivatives of hydrocarbons of the type $C_nH_{2n+2}$, for example tri-chlorohydrin (1:2:3-tri-chloropropane).

Sulphochlorides of hydrocarbons, such as ortho- or para-toluene sulphochloride, naphthalene sulpho-chloride.

Halogen derivatives of halogenated alkyl phenyl ethers, such as benzoylated chloro-anisol.

Acid esters of phenols, for example phenyl carbonate or phenyl-ethyl carbonate.

Acid halides, for example benzoyl halides, malonyl halides, di-ethyl malonyl halides.

Halogen derivatives of aromatic mono-carboxylic acids.

Halogen hydracid esters of phenyl glycols or phenyl glycerines or of their derivatives, for example ethers.

Phenyl alkylene oxides.

Phenyl-halogen-fatty acids, for example phenyl-chloro-acetic acid or phenyl-chloro-propionic acid.

Halogen derivatives of phenyl-paraffin-alcohol acids, for example phenyl-halogen-lactic acid or phenyl-halogen-oxy-propionic acid.

Phenyl-acetylene.

Halogen derivatives of olefine-benzols.

Halogen derivatives of phenyl-olefine alcohols or oxy-phenyl-olefine alcohols.

Halogen derivatives of pseudophenols, methylene quinones and quinols, for example ortho-oxy-mesityl chloride or piperonyl chloride.

Sulphochlorides of phenyl-mono-oxy-carboxylic acids, such as salicylic acid or cresotinic acid and chloro-or nitro-substitution products thereof.

Halogen derivatives of condensed nuclei, for example α-naphthalene-mono-halides or halogenated naphthalenes.

Halogen derivatives of hydro-naphthalene compounds, for example di-hydro-naphthalene-di-bromide or tetra - hydro - naphthalene - glycol - chlorhydrin.

Halogen derivatives of heterocyclic compounds having one nitrogen atom in the ring, for example halogen derivatives of pyridine or of its homologues, or halogen derivatives of quinoline or of its homologues, or halogen derivatives of iso-quinoline or of its homologues.

Sulphochlorines of heterocyclic compounds which contain one nitrogen atom in the ring, for example quinoline or pyridine.

Consequently in the specification and claims, wherever the context permits, the expression a soluble xanthate of a cellulose body signifies cellulose xanthate (viscose) and all other cellulose derivatives containing at least one CSS-group, of which the above are types.

Technically interesting results are obtained when the xanthates produced according to any one of the inventions described in my U. S. Patent application Ser. No. 435,647 (now Patent 1,858,097), or in my U. S. Patent application Ser. No. 556,719, or Ser. No. 521,018, or No. 521,023, or Ser. No. 521,017 are contacted with one or more of the reagents characteristic of the present invention.

If desired, one or more suitable inorganic or organic substances known in the viscose silk art, for example glycerine or glucose, or sodium sulphate, or sodium sulphite, or sodium bisulphite, or ammonium sulphate, or an alkali silicate, or an alkali aluminate, or ammonia, or an alkali phosphate, or a bluish colouring matter, or an oxidizing agent (such as peroxide), or a sulphonated fatty oil (for example, Turkey red oil), or finely divided sulphur, or a protein, or a proteid, or a phenol, or a naphthol, or an aldehyde, or a ketone may be added to the solutions of the products resulting from contacting viscose with one or more reagents of the aforementioned types or to the viscose before the contacting step. These substances may be added in any stage of the manufacture, for example, either to the cellulose xanthate before its dissolution or to the viscose or to the product resulting from the contacting of the viscose with one or more of the reagents of the aforementioned types.

The second part of the entire process of making artificial structures, (which part is being claimed in a divisional application, Ser. No. 79,197, filed May 11, 1936), namely the production of artificial structures, for instance artificial threads, films, bands and the like, is carried out in such a manner that one of the products obtained by contacting viscose or other xanthate solution, as set forth, with one or more of the reagents of the aforementioned types is brought into the form of an artificial structure and thereafter treated so as to cause separation of solid therefrom. The simplest and most advantageous procedure is to allow the product of the contacting of viscose with one or more reagents of the aforementioned types to enter through suitably shaped openings a coagulating bath, for example any one of the coagulating baths known in the viscose art or in the art of making artificial structures from any other alkali-soluble cellulose derivatives, cellulose compounds or cellulose conversion products.

The bath may have only a coagulating effect on the shaped solution or a coagulating effect on the shaped solution and a plasticizing effect on the artificial structure during or after its coagulation.

For the latter modification of the second part of the complete process, particularly suitable coagulating and plasticizing baths are such baths as contain not less than about 20 to 40, preferably not less than 45 per cent. of $H_2SO_4$, or an equivalent quantity of another mineral acid. Other agents exerting a similar effect may, however, be used, for instance baths consisting of, or containing by itself or in admixture with one or more other organic or one or more inorganic substances, a large proportion of one or more of the following baths (hereinafter termed plasticizing baths, for brevity):

Acid esters formed from a polybasic inorganic acid and a monohydric or polyhydric aliphatic or aromatic alcohol (for example methylsulphuric or ethylsulphuric acid or a mixture of methyl or ethyl alcohol or of one of their hydrates with concentrated sulphuric acid), or Glycerophosphoric acid, or glycerosulphuric acid, or a mixture of glycerine with concentrated sulphuric acid, or Sulphonic acids of aliphatic or aromatic hydrocarbons (for example oxy-(hydroxy) methylsulphonic acid or methionic acid or methyl- or ethyl-sulphonic acid or a sulphonic acid of a mineral oil or benzolsulphonic acid or phenol-sulphonic acid by itself or in admixture with sulphuric acid), or Carboxy-organo-mineral acids (for example sulphono-di-acetic acid or sulpho-acetic acid by itself or in admixture with sulphuric acid), or Aromatic sulpho-acids containing nitrogen by themselves or in admixture with sulphuric acid, or Baths in which sulphuric acid of less than 55 per cent. strength is used in combination with acid salts, such as bisulphates, for instance ammonium bisulphate, or Strong sulphuric acid containing formaldehyde or pyridine or any other organic substance, or Solutions of zinc halides alone or mixed with an acid or with another salt or both, or Any other plasticizing agent or equivalent for strong mineral acid.

The strong sulphuric acid or the other mineral acids or other plasticizing agents mentioned above may be used alone or (so far as is in conformity with the conditions of operation) mixed with one or several inorganic substances, for instance with one or several other strong mineral acids, such as hydrochloric acid, nitric acid, or phosphoric acid, or with a neutral or acid salt, such as sodium sulphate or sodium bisulphate, or ammonium bisulphate, ammonium sulphate, magnesium sulphate, zinc sulphate, sodium bisulphite, sodium sulphite, sodium nitrate or boric acid. To the plasticizing agents (such as strong sulphuric acid or another mineral acid or the other plasticizing agents mentioned above) or to a mixture of these with another strong acid or with one or several of the above-named inorganic substances, may be added (so far as is in conformity with the conditions under which the mineral acids or other plasticizing agents are used) a suitable quantity of one or several organic substances, such as glycerine, or a sugar, such as glucose, or an alcohol, or a salt of an organic base, for instance an aniline salt, or pyridine, or a pyridine salt, or an aldehyde, or an organic acid, such as acetic acid, or formic acid, or lactic acid, or oxalic acid.

It is to be understood that, in the modification of the invention in which the coagulating baths that have only little or no plasticizing effect on the freshly coagulated artificial structure are used, all suitable baths known in the viscose art and/or in the art of making artificial structures, particularly threads, from any alkali-soluble derivatives or conversion products of cellulose and from akaline solutions of cellulosic bodies, are meant to be included in the expression "coagulating baths" or "coagulating agents" wherever this expression is used to define such baths as have little or no plasticizing effect on the freshly coagulated structures. Consequently, not only the so-called Mueller-bath or any modification thereof and/or the baths set forth in the relative examples come into consideration as coagulating baths in the present process, but all baths known in the viscose art regardless of whether or not, in addition to the purely coagulating constitutents, such as acids and/or acid or neutral salts, they contain any other inorganic or organic (liquid, oily, crystalline or colloidal) substance or substances.

The modification of the invention in which plasticizing media are used, may also be so conducted that, first of all, the solution is caused to enter through suitably formed openings, a bath which has a coagulating effect on the solution, but little or no plasticizing effect on the freshly coagulated artificial structure, and then the artificial structure, preliminarily coagulated, treated with a medium which exerts a plasticizing effect, for instance with a bath having a high content of strong mineral acid, particularly having a content of at least 20 to 40 per cent. of sulphuric acid monohydrate, or any other plasticizing bath, for instance one of the plasticizing baths aforementioned. This latter method of conducting the process therefore requires two baths' in sequence. The second bath serves to plasticize. The first bath may be of such nature that the parent solution coagulates in water-soluble or water-insoluble form; for instance a solution of ammonium sulphate, or sodium bisulphate, or dilute sulphuric acid; or a liquid containing ammonium sulphate and sulphuric acid, or one of the various baths known in the artificial silk art, such as the Mueller-bath or the like. After having been conducted for a certain distance through such a bath, the artificial structure is introduced into a second bath which has a plasticizing effect on the coagulated artificial structure, for example a bath composed of one or several strong mineral acids, or containing one or several strong mineral acids, for instance not less than 20 to 40 per cent. of $H_2SO_4$, or an equivalent amount of another strong acid.

Regardless of whether the plasticizing modification of the second phase of the present process is conducted in one or two baths, the action of the plasticizing agent in or outside the bath must not be continued so long as to cause serious damage to (or even destruction of) the coagulated artificial structure. Consequently, in cases in which such coagulating and plasticizing or plasticizing baths are used as are capable of deteriorating the coagulated artificial structure, it is important to interrupt the action on the artificial structure, for example thread, of the plasticizing agent in general and of the strong acid in particular, by starting the washing process in good time or by using other means, for instance by exposing the artificial structures, for example threads, to a low temperature. The checking of the action of the plasticizing agent in general and that of the strong acid in particular, is preferably arranged before or when the artificial structure or threads arrive at the collecting device (spools, reels, centrifuges or the like). Only when the artificial structures, particularly threads, are collected in very thin layers, can the interruption of the action of the plasticizing agent, and particularly of the strong mineral acid, be postponed for a short time. For practical reasons, however, it is not advantageous to collect in thin layers.

If desired, the artificial structures, for example artificial threads, may be exposed to additional stretching during any stage of their production, for example between the outlet (or spinning nozzle) and the collecting device, that is by subjecting it to a stretching greater than is necessary for the formation of the artificial structure or thread and for conducting it from the outlet to the collecting device. This stretching may be effected by any of the known methods, either in the coagulating or in the coagulating and plasticizing bath or between the coagulating or the coagulating and plasticizing bath and the collecting device, or in both places. For instance, the distance between the collecting device and the bath may be made considerable, or the artificial structure or thread may be conducted over rods, hooks, rollers or differential rollers, which are arranged in the coagulating or in the coagulating and plasticizing bath or between the coagulating or the coagulating and plasticizing bath and the collecting device or in the coagulating or coagulating and plasticizing bath and between the coagulating or coagulating and plasticizing bath and the collecting device. The stretching may also be effected by using a very high speed of drawing or spinning, for instance 100 to 120 metres per minute. A high speed of drawing or spinning is generally to be recommended where working with additional stretch is desired, but no special measures need be applied in the course of the manufacture of the artificial structure or the spinning of the artificial thread for stretching the artificial structure or the thread.

The other conditions of working during the second phase of the process—that is the manufacture of the artificial structure—which must be observed, such as the temperature of the coagulating or of the coagulating and plasticizing bath, the length of immersion of the artificial structure, for example thread, in the coagulating or in the coagulating and plasticizing bath, the speed of drawing or spinning, the length of passage of the artificial structure, for example thread, through the air between the coagulating or the coagulating and plasticizing bath and the collecting device, and, if additional stretch is applied, the degree of additional stretching may be modified within wide limits.

The desulphurization and/or purification of the artificial structures produced according to the present invention, may be effected in any known manner, the process described in my U. S. Patent 2,004,875.

As is well known, it is usual to remove free sulphur from artificial structures (e. g. silk) made from viscose by treating the same with a dilute solution of sodium sulphide. In the case of first reacting the viscose with certain derivatives of polyhydric alcohols (or reacting alkali-cellulose with such derivatives and thereafter xanthating and dissolving), there is likely to be formed in the artificial structure (silk) a yellowish coloring matter and/or an opalescence, not readily removable by sodium sulphide solution of the strength heretofore commonly used in the desulphurizing treatment, but these are removable by treatment with a more concentrated sodium sulphide solution, say a 10% (or stronger) solution of sodium sulphide crystals ($Na_2S.9H_2O$). This process is covered in my copending application Ser. No. 464,426, filed June 27, 1930 now Patent No. 2,004,875. Such treatment may be effected hot or warm or cold.

After having been washed, the artificial structures, for example threads, may be steamed or heated before or after the drying process.

If desired, the extensibility of the artificial structures, particularly threads, produced according to the present process, may be still more increased by treating them with shrinking agents, for example according to the processes described in my U. S. Patent applications Ser. No. 308,589, Ser. No. 186,575, Ser. No. 367,154 and Ser. No. 367,150, (now U. S. Patents 1,989,098–100–101 and 2,001,621).

It is impossible to indicate every condition for success in every particular case, and it is to be understood that preliminary experiments cannot be avoided to find out what are the conditions necessary for success when using a particular cellulose, a particular form of alkali cellulose, a particular method of xanthation, a particular form of viscose, a particular reagent or mixture of reagents of the aforementioned types, particular quantitative proportions, particular working conditions, such as temperature, time or the like in the step of acting on viscose with the chosen reagent or reagents, and particular details of the operations connected with the second phase of the complete process, i. e. with the production of the artificial structures, for instance the spinning operation.

The products of the action on cellulose xanthate (viscose) of the reagents characteristic of the present invention, either in the form of the xanthates, that is so long as a CSS-group is present in them or after the whole amount of CSS that has been present in them is split off (in the latter case in the form of a preferably washed precipitate obtained for instance by acidifying the solution resulting from the contacting of a viscose with one or more reagents characteristic of the invention or in the form of artificial structures, for example artificial silk, or artificial silk waste produced according to the invention), may be converted into various derivatives, for example ethers or esters or hydroxy-acid ethers or the like by treating them in known manner with alkylating or aralkylating or hydroxy-alkylating or acylating agents or with halogen fatty acids or the like. As long as a CSS-group or groups are contained in their molecules, the products of the first phase of the invention may be in known manner converted into their xanthic acid esters, or xantho-fatty acids, or unsubstituted or N-substituted thiourethanes, or the like.

The following examples will further serve as practical illustrations of the invention, which, however, is in no way limited to the examples themselves or to the working conditions given in the examples, such as proportions, temperatures, times of reaction, viscosities, employed in the preparation of the initial materials, as well as in the preparation of the artificial structures therefrom, or to the composition of the spinning baths or the like: the parts are by weight:—

Example 1 (a) to (p)

100 parts of wood-pulp or cotton linters are introduced into 2000 parts of caustic soda solution of 18 per cent. strength at a temperature of 15° C. and left therein for 3 hours. The alkali cellulose is then pressed until it weighs 300 to 400 parts and thereafter shredded at a temperature of 11 to 15° C for 2½ to 3 hours, whereupon 60 parts of carbon bisulphide are added, and the carbon bisulphide is allowed to act for about 8 hours at a temperature of 18 to 20° C.

If the cellulose chosen, without maturing the alkali cellulose, gives a viscose exhibiting the desired degree of viscosity, the addition of carbon bisulphide occurs immediately or a short time after shredding. But, if the viscosity of the viscose obtainable from the chosen cellulose is, without maturing of the alkali cellulose, higher than desired, the carbon bisulphide is added after the shredded alkali cellulose has in known manner matured for so long a time as to yield a viscoe of the desired viscosity.

After the reaction with the carbon bisulphide is completed, any excess of carbon bisulphide is blown off during 10 to 15 minutes, and the xanthate so produced is dissolved in such a quantity of a caustic soda solution of appropriate strength as to yield a viscose containing about 6.5 per cent. of cellulose analytically determined by precipitation and 8 per cent. of NaOH.

As soon as the dissolution is complete, 50 to 75 parts of the crude (that is simply freed from alcohol and ammonia by distillation at reduced pressure and low temperature, for instance, at 30 to 40° C. and therefore often still containing some α-dichlorohydrine), or purified (for example according to any one of the methods described in Example 1 of my U. S. Patent application Ser. No. 618,800 filed concurrently, herewith, product of any one of the Examples 1 to 14 of my U. S. Patent application Ser. No. 618,800 or the product of any one of the examples of the divisional application 692,037 filed October 3, 1933, which, if very thick (viscous) may be dissolved in 100 to 250 parts of water, added in small portions to the viscose while stirring, and well stirred in.

Before being spun, the thus obtained solution is allowed to age for about 72 to 80 hours at a temperature of 15° C. to 20° C., during which time the solution is filtered three or four times through cotton, the last filtration being performed a short time before starting the spinning operation.

The spinning is conducted as follows:—

(a) The spinning solution is pressed at a speed of 3 ccm. per minute through a platinum nozzle having 100 perforations of 0.08 mm. diameter each into a bath containing 55 to 64 per cent. of $H_2SO_4$ and having a temperature of 16° C., the length of the immersion of the thread in the sulphuric acid being 20 to 80 cm. The thread is then allowed to pass for 70 to 120 cm. through the air is wound on a bobbin revolving so many times per minute as to produce a speed of spinning of about 30 m. per minute. The lower part of the bobbin revolves in water, so that the sulphuric acid is diluted as soon as the thread arrives at the bobbin. The threads are then washed, twisted, purified, for example according to the process described in my U. S. Patent No. 2,004,875, or by means of hot pyridine or alcoholic or aqueous solution of phenol or the like, if desired, bleached, and thereafter finished in the usual manner.

(b) The process is conducted as in (a), but with the difference that during its passage between the spinning bath and the bobbin, the thread is in any known manner subjected to additional stretch.

(c) The same mode of operation as in (a) or (b), but with the exception that the temperature of the sulphuric acid bath is 0° C.

(d) The process is conducted as in (a) or (b), but with the difference that the temperature of the sulphuric acid bath is 30 to 40° C.

(e) Mode of procedure as in (a) or (b) or (c) or (d), but with the difference that 6.2 ccm. of the spinning solution are discharged per minute, that the speed of spinning is 40 m. per minute and that the spinning bath contains 55 to 65 per cent. of $H_2SO_4$.

(f) Mode of operation as in (a) or (b) or (c) or (d), but with the difference that 3.3 ccm of the spinning solution are discharged per minute, that the platinum nozzle has 54 perforations of 0.1 mm diameter, that the speed of spinning is 18 m per minute and that the concentration of the spinning bath is 58 to 66 per cent. of $H_2SO_4$.

(g) Mode of procedure as in (a) or (b) or (c) or (d), but with the difference that the platinum nozzle has 24 perforations of 0.1 mm diameter, that the speed of spinning is 18 m per minute and that the spinning bath contains 58 to 64 per cent. of $H_2SO_4$.

(h) The process is conducted as in (a), but with the difference that the spinning solution is discharged at a speed of about 14 ccm per minute and that the speed of spinning is about 100 to 120 m per minute.

(i) Mode of procedure as in (a) to (h), but with the difference that the sulphuric acid is from the start saturated with sodium sulphate or ammonium bisulphate.

(k) The mode of procedure as in (i), but with the difference that the strengths of sulphuric acid are somewhat higher, on the average, by about 2 to 6 per cent. of $H_2SO_4$.

(l) The same mode of procedure as in (a) to (h), but with the difference that the coagulating bath contains 20 to 40 per cent. of $H_2SO_4$.

(m) Mode of procedure as in (l), but with the exception that the coagulating bath is saturated with sodium sulphate or sodium bisulphate or ammonium bisulphate.

(n) Mode of procedure as in (a) or (b) or (c) or (d) or (e) or (f) or (g) or (h), but with the difference that the spinning bath contains 10 to 15 per cent. of sulphuric acid.

(o) Mode of procedure as in (a) or (b) or (c) or (d) or (e) or (f) or (g) or (h), but with the difference that the spinning bath is a solution containing 15 to 20 per cent. of $H_2SO_4$ and 15 to 20 per cent. of sodium sulphate.

(p) Mode of procedure as in (a) or (b) or (c) or (d) or (e) or (f) or (g) or (h), but with the difference that the spinning bath is a solution containing 8 to 12 per cent. of $H_2SO_4$ and 28 per cent. of $Na_2SO_4$, the temperature of the spinning bath being either 16° or 40 to 45° C.

*Eample 2 (a) to (p)*

The process is conducted as in any one of the Examples 1 (a) to (p), but with the difference that instead of 50 to 75 parts, 40 parts of the crude or purified product of any one of the Examples 1 to 14 or my U. S. Patent application Ser. No. 618,800 or the product of any one of the examples of application Ser. No. 692,037 (which is a division of 618,800), are incorporated with the viscose, and that the spinning solution thus obtained is allowed to age for 48 to 90 to 100 hours at 15° C.

The strengths of the spinning acids in methods (a) to (i), are somewhat higher than in Example 1 (a) to (i).

*Example 3 (a) to (p)*

Mode of procedure as in any one of the Examples 1 (a) to (p) or 2 (a) to (p), but with the exception that the spinning solution is allowed to age for about 48 or about 96 hours.

*Example 4 (a) to (p)*

The process is conducted as in any one of the Examples 1 (a) to (p), but with the difference that instead of 50 to 75 parts, 30 parts of the crude of purified product of any one of the Examples 1 to 14 of my U. S. application Ser. No. 618,800 or the product of any one of the examples of application Ser. No. 692,037 (which is a division of 618,800), are contacted with the viscose, and that the spinning solution thus obtained is allowed to age for 72 to 96 to 100 hours.

The concentration of the spinning acids in the methods (a) to (i) are higher (for example by about 3 to 6 per cent. of $H_2SO_4$) than in Example 1 (a) to (i).

*Example 5 (a) to (p)*

The process is conducted as in any one of the Examples 2 (a) to (p), or 4 (a) to (p), but with the difference that the cellulose xanthate is dissolved in such an amount of caustic soda solution of appropriate strength as to yield a viscose containing about 6.5 per cent. of cellulose analytically determined by precipitation and 5 per cent. of NaOH.

*Example 6 (a) to (p)*

The initial viscose is prepared as in Example 1 but with the difference that as parent cellulose such wood-pulp or cotton linters are used as, ceteris paribus, yield viscose of pronounced high viscosity and that for the dissolving of the xanthate such a quantity of caustic soda and water is used as to yield a viscose containing about 3 per cent. of determinable cellulose and about 5 per cent. of NaOH, the viscosity of the viscose thus prepared being about 1 to 2 as compared with glycerine of 31° Bé. (1.26 specific gravity).

Immediately after the dissolution of the cellulose xanthate, 50 to 75 parts of the crude or purified product of any one of the Examples 1 to 14 of my U. S. application Ser. No. 618,800 or the product of any one of the examples of application Ser. No. 692,037 (which is a division of 618,800), are contacted with the viscose and the solution thus obtained allowed to age for 48 to 96 hours at 15° C.

The spinning solution is spun as in Examples 1 (a) to (h), but with the difference that the amounts of spinning solution discharged per minute and the concentrations of the spinning baths are as follows:

*Spinning methods (a), (b), (c) and (d)*

Quantity of spinning solution discharged per minute: About 6.8 ccm.

Concentration of the spinning bath: 54 to 65 per cent. of $H_2SO_4$.

Spinning method (e)

Quantity of spinning solution discharged per minute: About 14.3 ccm.

Concentration of the spinning bath: 56 to 67 per cent. of H₂SO₄.

Spinning method (f)

Quantity of the spinning solution discharged per minute: About 7.6 ccm.

Concentration of the spinning bath: 55 to 67 per cent. of H₂SO₄.

Spinning method (g)

Quantity of spinning solution discharged per minute: About 6.8 ccm.

Concentration of the spinning bath: 54 to 66 per cent. of H₂SO₄.

Spinning method (h)

Quantity of spinning solution discharged per minute: About 32 ccm.

Concentration of the spinning bath: 57 to 67 per cent. of H₂SO₄.

(i) Mode of operation as in (a) to (h), but with the difference that the sulphuric acid is saturated with sodium sulphate or magnesium sulphate.

(k) Mode of procedure as in (i), but with the difference that the strengths of the sulphuric acid are somewhat higher, on the average by about 2 to 6 per cent. of H₂SO₄.

(l) The same mode of procedure as in (a) to (h), but with the difference that the coagulating bath contains 40 per cent. of H₂SO₄.

(m) Mode of procedure as in (l), but with the exception that the coagulating bath is saturated with sodium sulphate or sodium bisulphate or ammonium bisulphate.

(n) Mode of procedure as in (a) or (b) or (c) or (d) or (e) or (f) or (g) or (h), but with the difference, that the spinning bath contains 10 to 15 per cent. of H₂SO₄.

(o) Mode of procedure as in (a) or (b) or (c) or (d) or (e) or (f) or (g) or (h), but with the difference that the spinning bath is a solution containing 15 per cent. of H₂SO₄ and 15 to 20 per cent. of sodium sulphate.

(p) Mode of procedure as in (a) or (b) or (c) or (d) or (e) or (f) or (g) or (h), but with the difference, that the spinning bath is a solution containing 8 to 12 per cent. of H₂SO₄ and 28 per cent. of Na₂SO₄, the temperature of the spinning bath being either 16 or 40 to 45° C.

Example 7 (a) to (p)

The process is conducted as in any one of the Examples 6 (a) to (p), but with the difference that only 30 parts of the crude or purified product of any one of the Examples 1 to 14 of my U. S. application Ser. No. 618,800 or the product of any one of the examples of application Ser. No. 692,037 (which is a division of 618,800), are employed, the strengths of the spinning acids in the methods (a) to (i) being somewhat higher (by about 2 to 5 per cent. on the average) than in Example 1 (a) to (h).

Example 8 (a) to (p)

The process is conducted as in any one of the Examples 1 (a) to (p) to 7 (a) to (p), but with the difference that, instead of the products of any one of the Examples 1 to 14 of my U. S. application Ser. No. 618,800 or the product of any one of the examples of application Ser. No. 692,037 (which is a division of 618,800), the alcohol-soluble part of the product of Example 13 as originally given in that application is used.

Example 9 (a) to (p)

The process is conducted as in any one of the Examples 1 (a) to (p) to 7 (a) to (p), but with the difference that, instead of the products of any one of the Examples 1 to 14 of my U. S. application Ser. No. 618,800 or of the example in Ser. No. 692,037, epichloramine [3-chlor-1-amino-propanol-(2) or 3-chlor-2-amino-propanol (1)] is used.

Example 10 (a) to (p)

The process is conducted as in any one of the Examples 1 (a) to (p) to 7 (a) to (p), but with the difference that, instead of the products of Examples 1 to 14 of my U. S. application Ser. No. 618,800 or the product of any one of the examples of application Ser. No. 692,037 (which is a division of 618,800), epichloramine-oxalate dissolved in tepid water, or epichloramine hydrochloride dissolved in water, is used, the viscose containing so much NaOH as to contain, after neutralization of the oxalic or hydrochloric acid, the amount of NaOH intended in the final spinning solutions of Examples 1 to 7.

Example 11 (a) to (p)

The process is conducted as in any one of the Examples 1 (a) to (p) to 7 (a) to (p), but with the difference that, instead of the products of Examples 1 to 14 of my U. S. application Ser. No. 618,800 or the product of any one of the examples of application Ser. No. 692,037 (which is a division of 618,800), an equimolecular proportion of tris-[chlor-hydroxy-propyl]-amine $([(CH_2Cl)(HO.CH_2)CH]_3N$ or $[CH_2Cl.CH(OH).CH_2]_3N)$ is employed.

Example 12 (a) to (p)

The process is conducted as in any one of the Examples 1 (a) to (p) to 7 (a) to (p), but with the difference that, instead of the products of Examples 1 to 14 of my U. S. application Ser. No. 618,800 or the product of any one of the examples of application Ser. No. 692,037 (which is a division of 618,800), tris-[chlor-hydroxy-propyl]-amine hydrochloride is used, the viscose containing so much NaOH as to contain, after neutralization of the HCl, the amount of NaOH intended in the final spinning solutions of the Examples 1 to 7.

Example 13 (a) to (p)

The process is conducted as in any one of the Examples 11 (a) to (p), but with the exception that, instead of the crystallized base (tris-[chloroxypropyl]-amine), its syrupy transformation product is used which is formed when the crystallized base dissolved in water is heated on the water bath.

Example 14 (a) to (p)

The process is conducted as in any one of the Examples 1 (a) to (p) to 7 (a) to (p), but with the difference that, instead of the products of Examples 1 to 14 of my U. S. application Ser. No. 618,800, or the product of any one of the examples of application Ser. No. 692,037 (which is a division of 618,800), the base produced by Reboul Annales de Chimie et de Physique (3) Volume LX) by acting with aqueous ammonia on epichlorhydrin is used in the form of its hydrochloride.

Example 15 (a) to (p)

Mode of procedure as in any one of the Examples 1 (a) to (p), but with the difference that, instead of the products of Examples 1 to 14 of my U. S. application Ser. No. 618,800, or the product of any one of the examples of application Ser. No. 692,037 (which is a division of 618,800), 130 parts of an aqueous solution of ammonia of 23 percent strength and immediately afterwards 30 parts of α-dichlorohydrin are incorporated with the viscose.

Example 16 (a) to (p)

Mode of procedure as in any one of the Examples 6 (a) to (p), but with the difference that, instead of the products of Examples 1 to 14 of my U. S. application Ser. No. 618,800, or the product of any one of the examples of application Ser. No. 692,037 (which is a division of 618,800), 218 parts of an aqueous solution of ammonia of 23 per cent. strength and immediately afterwards 30 parts of α-dichlorohydrine are incorporated with the viscose.

Example 17

One of the spinning solutions produced according to any one of the foregoing examples is spun in the known manner in one of the following baths:—

(1) In a solution of ammonium sulphate of 25 to 30 per cent. strength, or (2) In a bath consisting of 500 parts of sodium bisulphate, 76 parts of sulphuric acid of 66° Bé. and 587 parts of water, which bath may be kept at room temperature, or at a raised temperature, for instance 45° C., or (3) In a bath consisting of 982 parts of water, 180 parts of sodium sulphate, 60 parts of ammonium sulphate, 15 parts of zinc sulphate, 135 parts of glucose and 128 parts of sulphuric acid of 66° Bé.

The coagulated thread is introduced from one of the baths cited into a bath of the following composition:

(1) Sulphuric acid of 70 per cent. of $H_2SO_4$, or (2) Sulphuric acid of 60 to 65 per cent. of $H_2SO_4$, or (3) Sulphuric acid of 55 per cent. of $H_2SO_4$, or (4) A solution of 13.3 parts of ammonium sulphate in 120 parts of sulphuric acid of 55 to 70 per cent. of $H_2SO_4$.

The temperature of the second bath may be kept below room temperature, for instance at 0 to 10° C. or at room temperature, or even above room temperature, for instance at 25 to 45° C.

The length of immersion of the thread in the second bath may be small, for instance 20 cm or large, for instance 30 to 120 cm or more.

If desired, the threads may be stretched by any one of the known methods, either in the second bath or after they have left this.

The threads are collected while the sulphuric acid is removed or diluted by washing as has previously been described and thereafter washed and finished in the manner described in Example 1.

Example 18

The process is conducted as in any one of the preceding examples, but with the difference that, in the preparation of the alkali cellulose intended for making the initial viscose, the cellulose is not steeped in an excess of caustic soda solution and the excess of the latter removed by pressing, centrifuging or the like, but, from the very beginning, mixed with a proportion of caustic soda solution (for instance of 18 to 20 per cent. strength) containing as much NaOH as, or less NaOH than, is desired to have in the final viscose. For example, by mixing (in a shredder or in a so-called Werner-Pfleiderer vacuum xanthate machine) 100 parts of the cellulose with 400 to 600 parts of caustic soda solution of 18 to 20 per cent. strength until the mass is homogeneous, then adding 60 parts of carbon bisulphide, allowing the carbon bisulphide to act for several hours and dissolving, according to the proportion of NaOH desired in the viscose, the xanthated mass either in water or in dilute caustic soda solution, it is easy to obtain viscoses having a composition equal or similar to the composition of the viscoses used in the foregoing examples, the subsequent operations being, of course, the same as in the foregoing examples.

In all the foregoing examples, as far as they refer to strong acid or another plasticizing agent, that, if allowed to act upon the thread for too long a time, could damage the thread, the action of the acid may be interrupted also by subjecting the threads leaving the bath consisting of, or containing strong acid, to a low temperature, for instance −5 to −15° C. before they are washed, which, for instance may be done by collecting them on a hollow spool containing a cooling agent, for instance solid carbonic acid, or a freezing mixture, or ice.

Examples for the manufacture of staple fibre follow automatically from the foregoing examples.

When the threads have been washed, they may be heated or steamed at high temperature (for instance 100 to 110° C.) before or after the drying step.

Example 19

A solution like a spinning solution, produced in the manner described in any one of the foregoing examples is introduced in the known manner into one of the coagulating or coagulating and plasticizing baths named in the foregoing examples through a suitable hopper or slit, and the coagulated film band, after having been run through this bath is washed in the known manner and finished in any known manner.

Example 20

A cotton fabric is impregnated or filled or coated, one or several times, in a suitable machine, for instance a padding machine, or a backfilling machine or a spreading machine, with a solution like a spinning solution produced in the manner described in one of the foregoing examples, to which solution a filling material such as talc or China clay (for instance 100 to 200 per cent. calculated on the weight of the cellulose) or a dyestuff or a pigment, such as mica, or lamp-black, may be added and without or after being dried, if desired in a state of tension, is passed through a bath having the composition of one of the coagulating or coagulating and plasticizing baths mentioned in the foregoing examples. The dressed or coated fabric is then washed and finished in any known manner.

Example 21

The cellulose xanthate (i. e. the reaction mass after the sulphidizing step) obtained in Example 1 (a), is dissolved in such a quantity of caustic soda and water as to yield a viscose containing about 15 to 20 per cent. of analytically determinable cellulose and 8 to 10 per cent. of caustic soda. After the dissolution, 10 to 30 parts of any one of the nitrogen-containing bodies used in the foregoing examples for the contacting with the cellulose xanthate (viscose) are stirred or kneaded into the viscose at 15 to 20° C., whereupon, either immediately after the incorporation of the nitrogen-containing body, or after having allowed the mass to stand for 12 to 24 hours at 10 to 15° C., the pasty solution is used for pasting together one or more pairs of sheets of cardboard or thick cloth or the like. If desired, the material may be pressed or calendered; it is then introduced into a coagulating or into a coagulating and plasticizing bath and allowed to remain therein, until the acid bath has permeated the material, whereupon the material is washed free from acid and finished in any known manner.

Example 22

In a kneading machine, 10 to 30 parts of any one of the reagents used in any one of the foregoing examples for contacting with the viscose are thoroughly kneaded into a cellulose xanthate paste, for instance a paste containing 20 to 30 per cent. of analytically determinable cellulose and 12 to 15 per cent. of caustic soda. After the mass has become homogeneous, it is freed from gas bubbles (if any) for example in a vacuum kneader and then, either immediately after the kneading operation, or after having stood for 24 hours at 10 to 15° C., brought into the form of a thick plate. The thick plate is now introduced into sulphuric acid of about 60 per cent. strength at −5° C., where it remains until the plate solidifies. The coagulated thick plate is now washed free from acid and finished in any known manner.

Example 23

Instead of immersing the thick plate referred to in Example 22 directly into acid it may be first immersed in a solution of ammonium sulphate of 25 per cent. strength at 20° C., allowed to remain therein for a shorter or longer time (according to the thickness of the plate 10 minutes to 3 hours), and then be introduced into sulphuric acid of 55 to 60 per cent. strength at −5° C. for a short time, and then washed and finished.

Example 24

1000 parts of a solution like a spinning solution, produced in the manner described in any of the Examples 1 to 16 are mixed with 50 to 60 parts of zinc white or finely divided mica, or with 10 to 20 parts of soot and then printed in a roller printing machine on a cotton fabric. After being printed, the cotton fabric is, if desired, after being dried, introduced into one of the coagulating or coagulating and plasticizing baths named in the foregoing examples, and, after having been run through this bath, washed free from acid and finshed in any known manner.

The present process may also be carried out in such a manner that, instead of solely with one or more reagents of the aforementioned types, the cellulose xanthate or viscose respectively is in addition to one or more reagents of the aforementioned types contacted with one or more halogen derivatives of polyvalent alcohols, or with one or more halogen fatty acids, or with one or more trithio-carbonic acid esters, or with one or more reagents proposed in my U. S. application Ser. No. 521,020 (now Patent 2,021,864), or Ser. No. 597,640, filed March 8, 1932 for being contacted with viscose to produce an intermediate material for the manufacture of artificial threads or other products.

In so far as the reagent or reagents intended to be contacted with the cellulose xanthate (viscose) in addition to one or more reagents characteristic of the present invention are suitable for being used as parent materials for the preparation of the reagents characteristic of the present invention, this mixed use of reagents belonging to the groups set forth in the present specification on the one hand and the reagents set forth in the preceding paragraph on the other, may be effected by conducting the preparation of the parent reagent in such a manner that it contains a small or large proportion of the reagent to be contacted with the cellulose xanthate (viscose) in addition to one or more reagents characteristic of the present invention. (See for instance that modification of the foregoing Examples 1 to 7 in which the crude products of Examples 1 to 6 of my application Ser. No. 618,800 are used, these products often containing a small and sometimes a considerable proportion of α-dichlorohydrine.)

The said mixed use can be also effected by simply contacting cellulose xanthate (viscose) with one or more reagents characteristic of the present invention and with one or more halogen derivatives of polyvalent alcohols, or with one or more halogen fatty acids, or with one or more trithiocarbonic esters or with one or more reagents belonging to the groups set forth in my U. S. application Ser. No. 597,640 filed March 8, 1932, or my Patent 2,021,864, the reagents of different types being incorporated with the cellulose xanthate (viscose) either in the form of a previously made mixture (if they do not react with each other), or simultaneously, or consecutively in optional order.

The following example illustrates this mixed application of reagents of various types to the cellulose xanthate.

Example 25

The process is conducted as in any one of the preceding examples, but with the difference that only one-fifth to three-fifths of the stated amount of the reagent to be added to the viscose (in the example selected) is used, and that simultaneously with, or subsequently to, the addition of that reagent, 10 to 20 parts of α-dichlorohydrine, or of α-monochlorohydrine, or of ethylene chlorohydrine, or of ethylene oxide, or of chlor-acetic acid (for example in the form of its sodium salt), or of trithiocarbonic acid ester of glycerine, or of ethylene chloride, or of β-epidichlorohydrine, or of benzylglycol chlorohydrine, or of chloro-acetone, or of dichloro-acetone, or of β-bromopropylamine hydrochloride, or of β-chloropropylamine hydrochloride, or of β-dibromopropylamine hydrochloride, or of β-dichloropropylamine hydrochloride, or of chloroethyldiethylamine hydrochloride, or of benzoyl chloride, or of para-toluene sulpho-chloride, or of ortho-chloronitrobenzene, or of cinnamic alcohol dibromide, or of diethyl sulphate, or of dimethyl sulphate, or of 1:2-dichlorether, or of glycerophosphoric acid or of diacetin, or of one of the products described in my U. S. application Ser. No. 597,641 are incorporated with the viscose, and the product thus obtained, after having been allowed to age for 24 to 48 or 72 or 96 hours at 15° C. during which time it is filtered several times, is worked up into an artificial structure in a manner similar to that described in the foregoing examples.

As a matter of course, it is very easy, by any known method (for example by incorporating with the solution intended for making the artificial structure a gas or a substance capable of evolving a gas in the coagulating step, or a very finely divided liquid or solid substance that is insoluble in said solution and then removing this substance from the artificial structure by extraction with appropriate solvents or, if they are volatile, by evaporating them in vacuo or at atmospheric pressure at such temperatures as do not damage the artificial structure) to produce, according to the present process, hollow threads or coatings or sizings or dressings or films or the like containing hollow spaces.

It is further easy, according to the present process, to produce artificial threads or coatings or films or the like of diminished lustre by any known method, for example by adding to the solution intended for making the artificial structure such substances of mineral or animal or vegetable or synthetic origin as, according to the experience gained in the viscose silk art, are suitable for the reduction of the lustre of the artificial structures, for example threads or films or coatings or the like, for instance mineral or animal or vegetable oils or fats or soaps or aromatic hydrocarbons or their derivatives, or organic bases, such as aniline, or inorganic pigment-like materials (for instance salts, such as barium sulphate or a titanium salt), added to, or produced in the solution intended to be converted into the artificial structure or in the artificial structure during its manufacture.

In the foregoing examples, where desired or expedient, instead of the chlorine-derivatives, the equivalent quantities of the corresponding bromine-or iodine derivatives and vice-versa may be used.

Example 26

The process is conducted as in any one of the preceding examples, but with the difference that a solution or paste of a xanthate of a cellulosic body prepared according to any one of the inventions described in my U. S. applications Ser. No. 435,647 (now Patent 1,858,097) or Ser. No. 531,023, or Ser. No. 521,017, or 521,018, or Ser. No. 556,719 is used as parent material instead of viscose. In other words: The reagents characteristic of the present invention are, instead of with viscose, incorporated with a solution or paste of one of the xanthates prepared according to any one of the processes described in my applications enumerated in the preceding sentence. The respective xanthates may also contain a smaller or larger amount of cellulose xanthate.

As to the proportions: If the solutions or pastes of the xanthates prepared according to any one of the inventions described in my U. S. Patent applications Ser. No. 435,647 (now Patent 1,858,097), or Ser. No. 521,023, or Ser. No. 521,018, or Ser. No. 521,017, or Ser. No. 556,719 contain percentages of the xanthates and caustic soda equal or similar to the percentages of the xanthates and caustic soda contained in the viscoses employed in the foregoing examples, the nature and the amount of the reagents used in any one of the foregoing examples to be incorporated with the xanthates, may be the same as in the preceding examples, the conversion into the artificial structures being carried out as described in the preceding examples.

Instead of the reagents employed in the foregoing examples for being contacted with viscose, equivalent quantities of other agents of the types mentioned in the descriptive part preceding the examples may be used, for instance 2-chloro-2-nitro-propanol-(1), or 2-bromo-2-nitro-propanol-(1), 1-bromo-1-nitro-propanol-(2), 3:3:3-trichloro-1-nitro-propanol, acet-imido-$\beta$-chloro-ethyl ether, dibromo-acetic acid dimethyl-amide, N-methyl-N-chloro-acetyl-urea, dichloro-acetic acid ethyl-amide, oxalic acid ethyl ester-($\beta$-bromo-ethyl-amide), N-($\beta$, $\gamma$-dibromo-propyl)-urea, acetic acid ($\beta$, $\gamma$-dibromo-propyl-amide), trimethyl-(iodoxy-propyl)-ammonium hydroxide, chlor-acetyl-amino-acetic acid ethyl ester, chloracetyl-diglycine-amide, $\alpha$-$\beta$-dibromo-propionyl-amino acetic acid, $\beta$-chlor-$\alpha$-amino-propionic acid, 2-acetamino-benzyl chloride, chlor-allyl-phenyl-urea.

(2 - bromo-methyl-benzyl) - o -anisidine, 2 -($\gamma$-chlor-$\beta$-oxy-propylamino)-benzyl alcohol, 1[2] or 1[3] - chlor- 5 -amino- 4 -oxy-3-methoxy-1-propyl-benzene, chloropropyl-ethoxy-phenyl-urea

and the like.

As far as they are concerned with baths containing a high percentage of $H_2SO_4$, the foregoing examples may also be modified by using hydrochloric acid of 25 to 40 per cent. strength instead of strong sulphuric acid. Instead of the strong sulphuric acid or hydrochloric acid, there may be used strong nitric acid, for instance with a content of 40 to 90 per cent. of $HNO_3$, or strong phosphoric acid, for instance of 1 to 1.86 specific gravity, or strong arsenic acid, for instance with a content of 50 to 90 per cent. of $H_3AsO_4$, or a strong zinc chloride solution containing about 50 per cent. of zinc chloride and about 4 to 6 per cent. of hydrochloric acid, or a strong solution of a sulphonic acid, for example a 60 to 70 per cent. solution of benzol sulphonic acid or phenol sulphonic acid, or a strong solution of glycero-sulphuric acid, or methyl sulphuric acid, or ethyl sulphuric acid, in short, any agent that has a plasticizing effect on the freshly coagulated artificial structure, for example thread.

In the foregoing examples, in the preparation of the viscose, instead of sulphite cellulose or linters there may be used any other suitable wood-pulp or near conversion products of wood cellulose or cotton, for example cotton or wood-pulp which has been pre-treated cold or hot with dilute acid, for instance hydrochloric acid or sulphuric acid or with an organic acid, or mercerized cellulose, or regenerated cellulose in any available form, for example in the form of artificial fibres or waste artificial fibres, in short, any kind of cellulose material may be used which is used or has been proposed as parent material for making viscose or other cellulose derivatives, such as cellulose esters or ethers. Furthermore, all such cellulose compounds of any kind, (for example suitable alkyl-, hydroxy-alkyl- or aralkyl-ethers of cellulose or hydroxy-acid ethers of cellulose or the like) as still contain free hydroxyl groups accessible to xanthation with formation of soluble xanthates, may be used in the present invention as parent materials for the preparation of the xanthate to be contacted with the reagents characteristic of the present invention.

The artificial structure (e. g. threads, etc.) produced in accordance with the preferred examples of the present case, are inherently characterized by the following properties:—

(1) They are capable of being dyed by most of the usual dyestuffs, e. g. with (a) direct (or substantive) dyes, (b) acid dyes, (c) vat dyes, (d) sulphur dyes, and (e) some cellulose acetate dyes.

(2) They exhibit an excellent silky luster (if no delustering agents have been added to the cellulosic solution) and a "warmer" feel than the artificial silks made according to the disclosure of my U. S. Patent 2,021,862 or my U. S. Reissue Patent 18,170 and the other patents of that series.

(3) Tenacity—When the products have been coagulated in a strong acid (e. g. $H_2SO_4$ of 35% and preferably 45% or stronger), or have been first coagulated in a solution of a salt such as ammonium sulphate, or in a dilute acid, and the freshly coagulated thread treated with a strong acid, the threads show a dry tenacity above 2 grams per denier, and sometimes 3 or 4 grams per denier or more, and a high wet tenacity of say 1 to 2 grams per denier. They also have an extensibility of at least about 8%, and in some cases even 10 to 12%, and more, and they have excellent elasticity.

(4) They contain combined nitrogen and in many cases they contain unsaturated compounds, presumably derived from the unsaturated components of the reaction products of ammonia upon dihalogenhydrin.

(5) They are insoluble or only partly soluble in dilute alkali solutions, (e. g. 8% NaOH solution) and in the common organic solvents, such as ethyl alcohol, methyl alcohol, mixtures of these, acetone, methyl acetate, ether, etc.

(6) On being decomposed by heating with strong hydriodic acid, many of the products yield alkyl iodide, (and when the nitrogen-halogen-oxygen compound has been made by reacting ammonia on a dichlorohydrine of glycerine, they often yield $C_3H_7I$). The amount of the alkyl iodide so produced is variable, depending on the details of the treatment of the dihalogenhydrin with ammonia.

(7) They consist essentially of cellulosic bodies.

In the foregoing examples the cellulose xanthate and/or its solution (viscose) may be prepared in presence of an atmosphere containing oxygen smaller in amount than that contained in an equal volume of the surrounding air or in absence of oxygen, by conducting all or part of the operations under reduced atmospheric pressure or in presence of an inert gas, such as nitrogen, or by adding reducing agents or by both expedients.

In the specification, wherever the context permits, the expression acyl group means the part of an acid molecule which remains after the deduction of a hydroxyl group.

In the specification and claims, wherever the context permits, the expression "polyhydric" is intended to include dihydric and polyhydric, and the expression "polyvalent" is intended to include divalent or polyvalent. I am of course aware that some writers use the prefix "poly" to mean "at least three".

Where, in this description and in the examples, derivatives of glycerine containing halogen and nitrogen are mentioned, it will be understood that analogous derivatives of other polyhydric alcohols can be used.

In the specification, wherever the context permits, the expression "group containing nitrogen", is intended to include nitro-, amino and other groups which are fixed to carbon by nitrogen linkage.

The expression "artificial structures" used in the specification includes: Artificial threads, particularly artificial silk; films; coatings and layers of every kind; dressings on textiles, paper, leather and the like; sizings on yarns, book cloth; artificial leather; articles joined by means of adhesives or cements; plates and shaped plastic compositions in general; thickening agents or fixing agents for pigments applied on textiles by printing, coating and the like.

The term "artificial threads" denotes artificial threads and spun goods of all kinds, for instance artificial silk, staple fibre, artificial cotton, artificial wool, artificial hair, and artificial straw of any kind.

The expression "strong mineral acids" denotes sulphuric acid of at least 20 to 40 per cent. of $H_2SO_4$, preferably at least 45 per cent. of $H_2SO_4$, and as regards the other mineral acids, solution of equivalent strength.

The term "amino-group" and "hydroxyl group" are intended to embrace substituted or non-substituted amino-groups and substituted or non-substituted hydroxyl groups, respectively.

The term "amino" is intended to cover the primary and secondary amine groups, i. e. $NH_2$ and $NH$.

The term "a propanol" is intended to embrace propanol (propyl alcohol) and homologues thereof.

What I claim is:—

1. A method of manufacture of an intermediate product suitable for the production of artificial structures, which comprises reacting upon a soluble xanthate of a cellulose body with at least one organic compound which contains at least one nitrogen atom attached to a carbon atom in an aliphatic chain in an organic compound, and at least one oxygen atom attached to a carbon atom in said chain and at least one acid residue attached to a carbon atom in said chain, wherein at least one nitrogen atom and at least one oxygen atom and at least one acid residue are arranged in such a manner that not more than two of these three are attached to one and the same carbon atom whilst the third is attached to another carbon atom.

2. A method of manufacture of an intermediate product suitable for the production of artificial structures, which comprises contacting cellulose xanthate with at least one organic compound which contains at least one nitrogen atom attached to a carbon atom in an aliphatic chain in an organic compound, and at least one oxygen atom attached to a carbon atom in said chain and at least one halogen atom attached to a carbon atom in said chain, wherein at least one nitrogen atom and at least one oxygen atom and at least one halogen atom are arranged in such a manner that not more than two of these three are attached to one and the same carbon atom whilst the third is attached to another carbon atom.

3. A method of manufacture of an intermediate suitable for the production of artificial structures, which comprises contacting cellulose xanthate with at least one organic compound in an aliphatic chain included in the molecule of which at least one nitrogen atom is attached to a carbon atom and at least one oxygen atom is attached to another carbon atom and at least one acid residue is attached to a third carbon atom.

4. A method of manufacture of an intermediate suitable for the production of artificial structures, which comprises contacting cellulose xanthate with at least one organic compound in an aliphatic chain of which at least one nitrogen atom is attached to a carbon atom and at least one oxygen atom is attached to another carbon atom and at least one halogen atom is attached to a third carbon atom.

5. A method of manufacture of an intermediate suitable for the production of artificial structures, which comprises contacting cellulose xanthate with at least one organic compound which contains at least one amino-group and at least one hydroxyl group and at least one halogen atom, in an aliphatic chain, which substituents are attached to carbon atoms in said aliphatic chain, but not all to the same carbon atom.

6. A method of manufacture of an intermediate product suitable for the production of artificial structures, which comprises contacting cellulose xanthate with at least one glycerine derivative which contains at least one nitrogen atom attached to a carbon atom and at least one oxygen atom attached to a carbon atom and at least one acid residue attached to a carbon atom, wherein at least one nitrogen atom and at least one oxygen atom and at least one acid residue are arranged in such manner that not more than two of these three are attached to one and the same carbon atom whilst the third is attached to another carbon atom.

7. A method of manufacture of an intermediate suitable for the production of artificial structures, which comprises contacting a xanthate with at least one glycerine derivative in the molecule of which at least one nitrogen atom is attached to a carbon atom and at least one oxygen atom is attached to another carbon atom and at least one halogen atom is attached to a third carbon atom.

8. A method of manufacture of an intermediate suitable for the production of artificial structures, which comprises contacting cellulose xanthate with at least one glycerine derivative which contains at least one amino-group and at least one hydroxyl group and at least one acid residue, which substituents are attached to carbon atoms of the glycerine, but not all to the same carbon atom.

9. A manufacture of materials suitable for the production of artificial structures, which comprises contacting a xanthate of a cellulose body with at least one organic compound which is a halogen derivative of an amino-derivative of a polyhydric alcohol.

10. A manufacture of materials suitable for the production of artificial structures, which comprises contacting cellulose xanthate with at least one organic compound which is a halogen derivative of an amino-derivative of a propanol.

11. A method of manufacture as claimed in claim 1, wherein the organic compound used also contains sulphur.

12. In the treatment of cellulose xanthate, the herein described process which comprises reacting therewith, a reaction product of a dihalogenhydrine with ammonia, soluble in a liquid solvent selected from the group water and alcohol.

13. The herein described new intermediate suitable for the preparation of artificial structures, which comprises a solution of a reaction product of a soluble xanthate of a cellulosic body with at least one organic compound which contains, in an aliphatic chain, at least one nitrogen atom attached to a carbon atom and at least one oxygen atom attached to a carbon atom and at least one acid residue attached to a carbon atom wherein at least one nitrogen atom and at least one oxygen atom and at least one acid residue are arranged in such a manner that not more than two of these three are attached to one and the same carbon atom whilst the third is attached to another carbon atom.

14. The herein described new intermediate suitable for the preparation of artificial structures, which comprises a solution of a product of the action on cellulose xanthate of at least one organic compound which contains at least one nitrogen atom attached to a carbon atom of an aliphatic chain and at least one oxygen atom attached to a carbon atom of said chain and at least one halogen atom attached to a carbon atom of said chain, wherein at least one nitrogen atom and at least one oxygen atom and at least one halogen atom are arranged in such a manner that not more than two of these three are attached to one and the same carbon atom whilst the third is attached to another carbon atom.

15. The herein described new intermediate suitable for the preparation of artificial structures, which comprises a solution of a product of the action on cellulose xanthate of at least one organic compound in an aliphatic chain of the molecule of which at least one nitrogen atom is attached to a carbon atom and at least one oxygen atom is attached to another carbon atom and at least one acid residue is attached to a third carbon atom.

16. The herein described new intermediate suitable for the preparation of artificial structures, which comprises a solution of a product of the action on cellulose xanthate of at least one organic compound in an aliphatic chain of the molecule of which at least one nitrogen atom is attached to a carbon atom and at least one oxygen atom is attached to another carbon atom and at least one halogen atom is attached to a third carbon atom.

17. The herein described new intermediate suitable for the preparation of artificial structures, which comprises a solution of a product of the action on cellulose xanthate of at least one organic compound which contains in an aliphatic chain, at least one amino-group and at least one hydroxyl group and at least one acid residue in an aliphatic chain, which substituents are attached to carbon atoms in said aliphatic chain, but not all to the same carbon atom.

18. The herein described new intermediate suitable for the preparation of artificial structures, which comprises a solution of a product of the action upon cellulose xanthate of at least one organic compound which contains, in an aliphatic chain, at least one amino-group and at least one hydroxyl group and at least one halogen atom in an aliphatic chain, which substituents are attached to carbon atoms in said aliphatic chain, but not all to the same carbon atom.

19. The herein described new intermediate suitable for the preparation of artificial structures, which comprises a solution of a product of the action on cellulose xanthate of at least one glycerine derivative which contains at least one nitrogen atom attached to a carbon atom and at least one oxygen atom attached to a carbon atom and at least one acid residue attached to a carbon atom, wherein at least one nitrogen atom and at least one oxygen atom and at least one acid residue are arranged in such manner that not more than two of these three are attached to one and the same carbon atom whilst the third is attached to another carbon atom.

20. The herein described new intermediate suitable for the preparation of artificial structures, which comprises a solution of a product of the action on cellulose xanthate of at least one glycerine derivative which contains at least one nitrogen atom attached to a carbon atom and at least one oxygen atom attached to a carbon atom and at least one halogen atom attached to a carbon atom, wherein at least one nitrogen atom and at least one oxygen atom and at least one halogen atom are arranged in such a manner that not more than two of these three are attached to one and the same carbon atom whilst the third is attached to another carbon atom.

21. The herein described new intermediate suitable for the preparation of artificial structures, which comprises a solution of a product of the action on cellulose xanthate of at least one glycerine derivative in the molecule of which at least one nitrogen atom is attached to a carbon atom and at least one oxygen atom is attached to another carbon atom and at least one halogen atom is attached to a third carbon atom.

22. The herein described new intermediate suitable for the preparation of artificial structures, which comprises a solution of a product of the action on cellulose xanthate of at least one glycerine derivative which contains at least one amino-group and at least one hydroxyl group and at least one acid residue.

23. The herein described new intermediate suitable for the preparation of artificial structures, which comprises a solution of a reaction product of cellulose xanthate with at least one glycerine derivative which is a halogen derivative of an amino-derivative of a propanol.

24. The herein described new intermediate suitable for the preparation of artificial structures, which comprises a solution of a product of the action on cellulose xanthate of at least one organic compound which is a halogen derivative of an amino derivative of a polyhydric alcohol.

25. The herein described new intermediate suitable for the preparation of artificial structures, which comprises a solution of a product of the action on cellulose xanthate of at least one organic compound which is a halogen derivative of an amino-derivative of a polyhydric alcohol and which compound contains at least one oxygen atom bound to a carbon atom of the nucleus of said polyhydric alcohol.

26. The herein described new intermediate suitable for the preparation of artificial structures, which comprises a solution of a reaction product of cellulose xanthate with at least one organic compound which is a halogen derivative of an amino-derivative of glycerine.

27. The herein described new intermediate suitable for the preparation of artificial structures, which comprises a solution of the product of the action on cellulose xanthate of at least one organic compound which is a halogen derivative of an amino-derivative of a propanol.

28. An intermediate as claimed in claim 13, wherein the said organic compound contains sulphur.

29. An intermediate as claimed in claim 13, wherein the said organic compound is a reaction product of a dihalogen-hydrine and ammonia, which is soluble in a solvent selected from the group consisting of alcohol and water.

30. The herein described new intermediate suitable for the preparation of artificial structures, which comprises a solution of a product of the action on viscose of at least one organic compound as defined in claim 1.

31. As new materials, intermediate products containing at least one cellulose derivative which contains at least one CSS-group, and an organic radical containing at least one oxygen atom and at least one nitrogen atom, both attached to carbon atoms of an aliphatic chain.

32. As new materials, intermediate products containing at least one cellulose derivative which contains at least one CSS-group, and an organic radical containing at least one nitrogen atom and at least one hydroxyl group, both attached to carbon atoms of an aliphatic chain in said organic radical.

33. As new materials, intermediate products containing at least one cellulose derivative which contains at least one CSS-group, and a radical of a polyhydric alcohol containing at least one oxygen atom and at least one nitrogen atom, both attached to carbon.

34. As new materials, intermediate products containing at least one cellulose derivative which contains at least one CSS-group, and a radical of a polyhydric alcohol containing at least one hydroxyl group, and at least one nitrogen atom.

35. As new materials, intermediate products containing at least one cellulose derivative which contains at least one CSS-group, and a radical of glycerine containing at least one hydroxyl group and containing a nitrogen-hydrogen group, both of said groups united to carbon atoms of said glycerine radical.

36. As a new material, a solution of an intermediate product containing at least one cellulose derivative which contains at least one CSS-group and an organic radical which contains, in an aliphatic chain, at least one nitrogen atom attached to carbon and at least one oxygen atom attached to carbon, and from which solution a solid cellulosic body may be precipitated.

37. As a new material, an intermediate product which is a solution of at least one cellulose derivative which contains at least one CSS-group, and which contains in an aliphatic chain, at least one nitrogen atom and at least one hydroxyl group, both attached to carbon, and from which solution a solid cellulosic body may be precipitated.

38. As a new material, an intermediate product which is a solution of at least one cellulose derivative which contains at least one CSS-group, and a radical of a polyhydric alcohol containing at least one oxygen atom and at least one nitrogen atom, both attached to carbon, and from which solution solid shaped structures may be precipitated.

39. As a new material, an intermediate product which is a solution containing at least one cellulose derivative which contains at least one CSS-group, and a radical of a polyhydric alcohol containing at least one hydroxyl group, and at least one nitrogen-hydrogen group, both of said groups attached to carbon and from which solution, artificial structures may be precipitated.

40. As a new material, an intermediate product being an alkaline solution of at least one cellulose derivative which contains at least one CSS-group, and a radical of glycerine containing nitrogen and at least one hydroxyl group, and from which solution a solid cellulose body can be precipitated.

LEON LILIENFELD.